United States Patent

[11] 3,602,386

| [72] | Inventor | Gunnar A. Brime<br>Lund, Sweden |
|---|---|---|
| [21] | Appl. No. | 809,089 |
| [22] | Filed | Mar. 21, 1969 |
| [45] | Patented | Aug. 31, 1971 |
| [73] | Assignee | AB Dixie Cup<br>Lund, Sweden |
| [32] | Priority | Mar. 22, 1968 |
| [33] | | Sweden |
| [31] | | 3909/1968 |

[54] DRINKING VESSEL HAVING EXCHANGEABLE INSERT OR LINING
4 Claims, 1 Drawing Fig.

[52] U.S. Cl. .................................................. 215/13, 220/15, 220/17
[51] Int. Cl. .................................................. A47j 47/00
[50] Field of Search .................................................. 220/65, 63, 15, 17, 13, 10; 215/13

[56] References Cited
UNITED STATES PATENTS

| 1,191,319 | 7/1916 | Kline | 220/9 |
| 1,895,212 | 1/1933 | Smith | 220/15 UX |
| 1,533,318 | 4/1925 | Ihling | 220/17 X |
| 1,975,241 | 10/1934 | Werber et al. | 220/17 |
| 2,569,958 | 10/1951 | Struve et al. | 220/13 |
| 2,782,616 | 2/1957 | Eron | 220/65 |

FOREIGN PATENTS

| 224,174 | 9/1959 | Australia | 229/3.5 (MF) |
| 1,122,663 | 8/1968 | Great Britain | 215/13 |

*Primary Examiner*—Joseph R. Leclair
*Assistant Examiner*—James R. Garrett
*Attorney*—Leon M. Strauss

ABSTRACT: A drinking vessel comprises a rigid cup-shaped body and a lining inserted therein, the lining being formed as a cup with one or more internal shoulders which rigidify the lining, said cup substantially freely depending from the orifice portion adjacent the top edge of said body, which is received in a groove formed by the orifice portion of the lining.

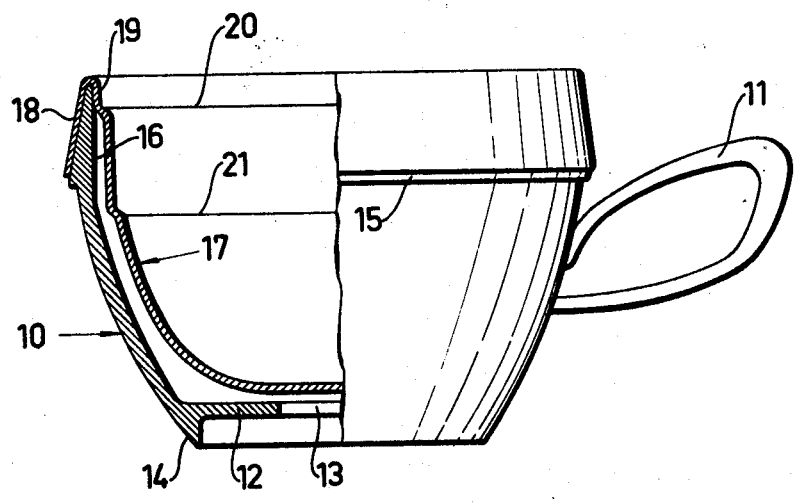

DRINKING VESSEL HAVING EXCHANGEABLE INSERT OR LINING

SUMMARY OF THE INVENTION

The present invention relates to a drinking vessel having an essentially rigid cup-shaped body of circular cross-sectional shape and a thin-walled lining inserted into the body, said lining being provided at its orifice portion with a downwardly directed external collar defining, together with the lining wall, an annular groove in which the orifice portion of the body is received and which makes contact with the body adjacent the orifice top edge thereof at least on the outside of the body.

The purpose of the invention is to provide a drinking vessel of the kind described which fulfils the highest demands of hygiene and economy and giving, when being used, the same feeling which is characteristic to a conventional drinking vessel of glass or china.

This is achieved according to the invention by locating the lining as a cup in the interior of the body, substantially depending freely thereinto and having at least one annular internal shoulder formed by reducing the diameter of the lining while retaining its wall thickness. It is therefore an important object of the invention to provide means resulting in a very useful and inexpensive drinking vessel assembly of the described type. Other objects of the invention are directed to means locating the thin-walled cup-shaped lining within the cup-shaped body a predetermined distance therefrom but releasably anchoring said lining only at the orifice portion of the body therewithin and therewithout.

The lining is the liquid-receiving part of the drinking vessel and that part which comes into contact with the lips when the vessel is being used. It may be made as an inexpensive disposable article and may be discarded after use, whereas the body is meant to be used several times with subsequent different linings. It will as a rule not become soiled and will not come into contact with the lips when being used and does not therefore have to be cleaned after each time of use. Instead, the washing can be deferred until the body has been used several times without neglecting hygienic conditions. With the aid of the replaceable lining of the disposable type the dishwashing problem has been solved in a manner which is as simple as it is convenient and pleasant. The body imparts thickness and rigidity to the orifice portion of the lining, and consequently the drinking vessel assembled by the lining and the cup body becomes pleasant to drink from, and due to the shoulder arrangement provided on the lining sufficient rigidity is created even if the lining is made from thin plastic material.

DETAILED DESCRIPTION OF THE INVENTION

An embodiment of the invention will be described in greater detail with reference to the accompanying drawing showing a article according to the invention, partly in axial sectional view and partly in side elevational view.

The cup shown in the drawing comprises an essentially rigid cup-shaped body 10 of circular cross section which is made throughout of plastic and may be produced by injection moulding. The body 10 has a lug or handle 11, its bottom 12 being provided with a central opening 13 surrounded by an annular flange 14 serving as a foot for the cup-shaped body. Adjacent its orifice top edge or margin the body 10 has on its outside a slightly conical or substantially conical annular surface portion 15 and on its inside a cylindrical or substantially cylindrical annular surface portion 16 of essentially the same axial length as the surface portion 15.

Inside the cup-shaped body 10 there is disposed a replaceable cup-shaped thin-walled lining 17 which is preferably made of plastic composition and which may be formed by vacuum moulding. At its orifice margin or top edge said lining has a downwardly directed external collar 18 forming a conical mantle of essentially the same conicity as the conical annular surface portion 15 of the body 10 in order to fit the surface portion 15 with its inside. Adjacent its orifice margin the lining 17 besides forms a cylindrical wall portion 19 located inside the collar 18 and defining, together with the collar 18, an annular groove in which the lining 17 inserted into the body 10 will receive the orifice portion of the body. Between the lining and the body in the annular groove there should be such fit that the lining will remain in the body even if the body is turned upside-down but must not be so tight that it is difficult to remove the lining from the body. In the embodiment shown the cylindrical portion 19 of the lining 17 has an axial length which is small in relation to the collar, but it is of course possible to give this cylindrical portion the same axial length as the collar 18, i.e., to make it so large that it will cover the whole upper cylindrical surface portion 16 of the body. Despite this, the necessary fit between the lining and the body will in most cases be possible to achieve by means of a shorter cylindrical portion 19.

The portion 19 of the lining 17 is offset from the rest of the lining by an inwardly directed shoulder 20, and the lining is provided with an additional shoulder 21 spaced axially from the shoulder 20. These shoulders (of which there may be more than two) serve to impart a certain rigidity to the lining despite the thin wall so that the lining will not depend like a bag from the orifice margin or top edge of the body when it is filled with liquid but will have the shown cup-shape also in such state. The lining is spaced from the inside of the body 10 over its entire surface except at the cylindrical portion 19.

As shown, the body 10 and the lining 17 form together a cup of almost the same shape as an ordinary china cup having a relatively thick and rigid orifice margin which is "tasty" to drink from. Only the lining will come into contact with the user's lips so that the body 10 may be used again by another person without having to be cleaned or washed after the lining previously used has been removed and been replaced with a new lining.

The exchange of the lining cup 17 is facilitated by the fact that the collar 18 rests against the conical surface portion 15 of the body so that a certain relief is obtained between the lining and the body, and by the opening 13 in the bottom 12 of the body, which prevents pressure and suction from arising between the lining and the body when inserting or removing the lining and which will besides make it possible to press with a finger from below against the lining when removing it. It should, however, be pointed out that the collar 18 and the surface portion 15 may also be made cylindrical or substantially cylindrical even if the embodiment here disclosed is of conical or substantially conical shape which is to be preferred. It has been mentioned above that the cylindrical portion 19 of the lining may be longer than shown in the drawing, and this may be suitable from the viewpoint that the shoulder 20 will then become spaced longer from the orifice margin, thereby reducing the possibility that it will come into contact with the lips when the cup is being used for drinking, which may give an unpleasant feeling. For the same reason it is possible to make the shoulder less sharply offset than shown in the drawing.

The invention is consequently not limited to the embodiment shown but may be modified within the scope of the appended claims, not only in the respects mentioned above but also with respect to the shape of the body 10, which may be adjusted to different existing types of drinking vessels, such as goblets without lugs as well as mugs of different types, and is not strictly limited to that kind of tableware which is ordinarily called a cup.

It should finally be pointed out that it is not necessary to let the lining rest against the orifice portion of the body on both sides thereof, but it may be sufficient to provide for contact on the outside, i.e. between the inside of the collar 18 and the annular conical surface portion 15, whereas there is no contact between the annular cylindrical surface portion 16 and the lining.

What I claim is:

1. A drinking vessel comprising an essentially rigid cup-shaped body of circular horizontal cross-sectional shape and forming an orifice portion adjacent its top edge, a thin-walled lining inserted into the body and having an orifice portion, a downwardly directed external collar extending from the orifice portion of said lining, said collar defining together with an adjacent wall part of said lining an annular groove receiving the orifice portion of said body, both of the lining wall surfaces confronting each other in said groove being in contact with the body adjacent the orifice top edge thereof, the lining constituting a cup substantially depending freely from said body top edge into the interior of the cup-shaped body, a part of the inside surface of the body and said wall part of said lining, which together with the collar defines the groove each having at least a substantially cylindrical surface portion adjacent the orifice top edge and the bottom of the groove, respectively, said cylindrical surface portion on the lining having a shorter axial length than the cylindrical surface portion located on the inside surface of said body.

2. A drinking vessel as claimed in claim 1, in which a first inwardly extending annular shoulder is formed on that wall part of the lining which together with the collar defines the groove, and at least a second inwardly extending annular internal shoulder is formed on that part of said lining below said first shoulder.

3. A drinking vessel as claimed in claim 1, in which a substantially conical surface portion is provided on the outside of the body adjacent its top edge, the cylindrical surface portion on the inside surface of the body and said conical surface portion on the outside of the body having essentially the same axial length.

4. A bowl-shaped lining having a thin wall of plastic composition, said lining being defined by a relatively long, outer frustoconical flange part and by a relatively short cylindrical sidewall part, which are connected together to form a substantially inverted U-shaped groove, said sidewall part of said lining being provided with a shoulder arrangement including two spaced apart shoulders directed toward the axis of said bowl-shaped lining, one shoulder of said lining being offset inwardly with respect to the inner face of said sidewall part of said lining, which lining sidewall part has a shorter axial length than that of said lining flange, said one lining shoulder projecting axially inwardly toward the bottom of the bowl-shaped lining thereby to reduce the diameter of the lining sidewall, the other shoulder of said shoulder arrangement being located a predetermined distance substantially parallely to and below said one shoulder and being further offset inwardly with respect to said lining sidewall, thereby to further reduce the inner diameter of said bowl-shaped lining without reducing the lining wall thickness, while reinforcing the lining wall.